Figure 1:
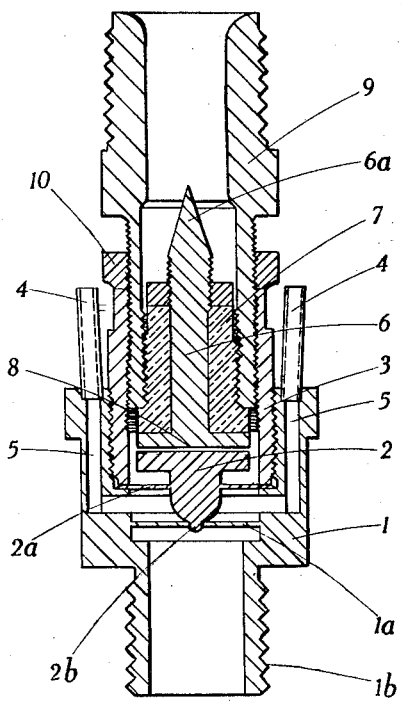

Jan. 23, 1945.  T. D. HUMPHREYS ET AL  2,367,866
ELECTRICAL APPARATUS
Filed April 23, 1940   2 Sheets-Sheet 1

Inventors
EDWIN MATHIESON DODDS
THOMAS DENIS HUMPHREYS
by
Attorney

Patented Jan. 23, 1945

2,367,866

UNITED STATES PATENT OFFICE 2,367,866

ELECTRICAL APPARATUS

Thomas Denis Humphreys and Edwin Mathieson Dodds, London, England; said Humphreys assignor to A. C. Cossor Limited, London, England, a British company Application April 23, 1940, Serial No. 331,254
In Great Britain April 24, 1939

17 Claims. (Cl. 177—311)

This invention relates to apparatus for the measurement, by electrical means, of mechanical pressures or movements or of derivatives of these quantities. The term "measurement" is used in a broad sense to include, for example, the actuation of a relay when a limiting condition of the measured quantity is reached.

In apparatus of this character, a device is employed, an electrical characteristic of which varies in accordance with a pressure or a movement applied to the device, or with a derivative of one of these quantities. Such a device will hereinafter be referred to as an "electrical pressure element."

If the electrical characteristic which so varies, and which is measured, is the impedance or the capacity of the element, it is termed an "electrical impedance pressure element" or "electrical condenser pressure element," as the case may be. The term "impedance" is used in its usual broad sense to include capacity reactance, inductance reactance, resistance or any combination of the three characteristics.

One of the most useful applications of electrical pressure elements is the measurement of varying fluid pressures; for example, the pressures in the cylinders of internal combustion engines. It is, therefore, preferred that an electrical pressure element shall be so constructed as to be suitable for measuring fluid pressures. The same element may, however, be suitable also for measuring linear thrusts or small movements.

An electrical pressure element is usually provided with a diaphragm which is fixed at its edge and which is deflected to different degrees in accordance with the different fluid pressures, or the different thrusts or the movements which are applied. Such a diaphragm may be of the "supported" type, that is to say, it may serve simply to convert the fluid pressure into a linear thrust, or to transmit the linear thrust or movement, which is then applied to a supporting body such as a piezo-electric crystal or carbon composition resistance, the compression of which provides the restoring force. Alternatively, it may be of the "unsupported" or self-restoring type in which at least the greater part of the restoring force is provided by the mechanical resistance to deflection offered by the diaphragm itself. In an element having a self-restoring diaphragm, means must be provided to obtain an electrical response to deflections of the diaphragm or else to movements of a body mechanically coupled to the diaphragm and capable of moving freely therewith.

According to one feature of the invention there is provided an electrical pressure element suitable for measuring fluid pressures, which comprises a self-restoring diaphragm, one face of which is exposed to the pressure to be measured, and which comprises a member rigidly fixed to the middle of the diaphragm so as to move therewith when the diaphragm is deflected, this member having a plane face, perpendicular to the direction of movement, arranged adjacent to the fixed electrical member of the element to cooperate therewith. The element may be an inductance element, of which the fixed electrical member is the coil and the moving member is the armature. It is preferred, however, to use a condenser element, of which the fixed and moving members are the two condenser plates.

According to another feature of the invention there is provided an electrical condenser pressure element suitable for measuring fluid pressures, having a single earthed plate formed by a diaphragm one face of which is exposed to the pressures to be measured or by a member coupled to such a diaphragm, and having two insulated fixed plates, so that the element provides two condensers having a common earthed plate and having capacities each of which varies with deflection of the diaphragm. The fixed plates may, for example, be concentric, but it is preferred that they be balanced or electrically symmetrical with respect to ground, so that they will provide a balanced input to a measuring circuit when connected thereto through an electrically symmetrical feeder.

According to another feature of the invention there is provided an electrical pressure element suitable for measuring fluid pressures, comprising a self-restoring diaphragm, one face of which is exposed to the pressure to be measured, while temperature-maintaining fluid is passed in contact with substantially the whole of the other face. The diaphragm may, for example, be the armature of an inductance element, but it is preferred that it shall itself form, or be rigidly secured to, one plate of a condenser element, in accordance with other features of the invention.

According to another feature of the invention there is provided an electrical condenser pressure element suitable for measuring fluid pressures, wherein a self-restoring diaphragm, arranged for one face to be exposed to the pressures to be measured, serves as the moving plate of the condenser, the other plate being fixed.

According to another feature of the invention there is provided a pressure or movement measuring apparatus which comprises an electrical impedance pressure element coupled by a low impedance feeder to a measuring circuit, the measuring circuit comprising a source of alternating current of a frequency of the order of ten megacycles or more, the arrangement being such that current from this source is passed through the feeder and the pressure element and that the measuring circuit provides a response in accordance with the modulation of this current by variations of the impedance of the pressure element.

Figure 2:
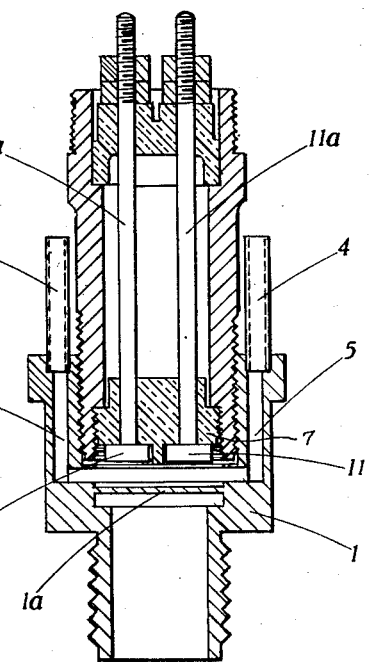
Figure 3:
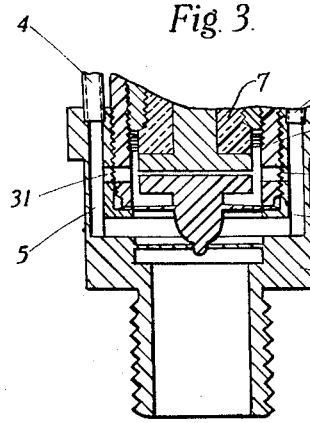
Figure 4:
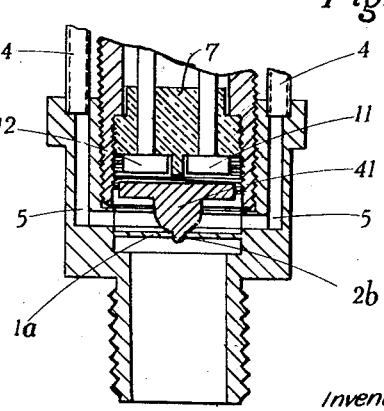
Figure 5:
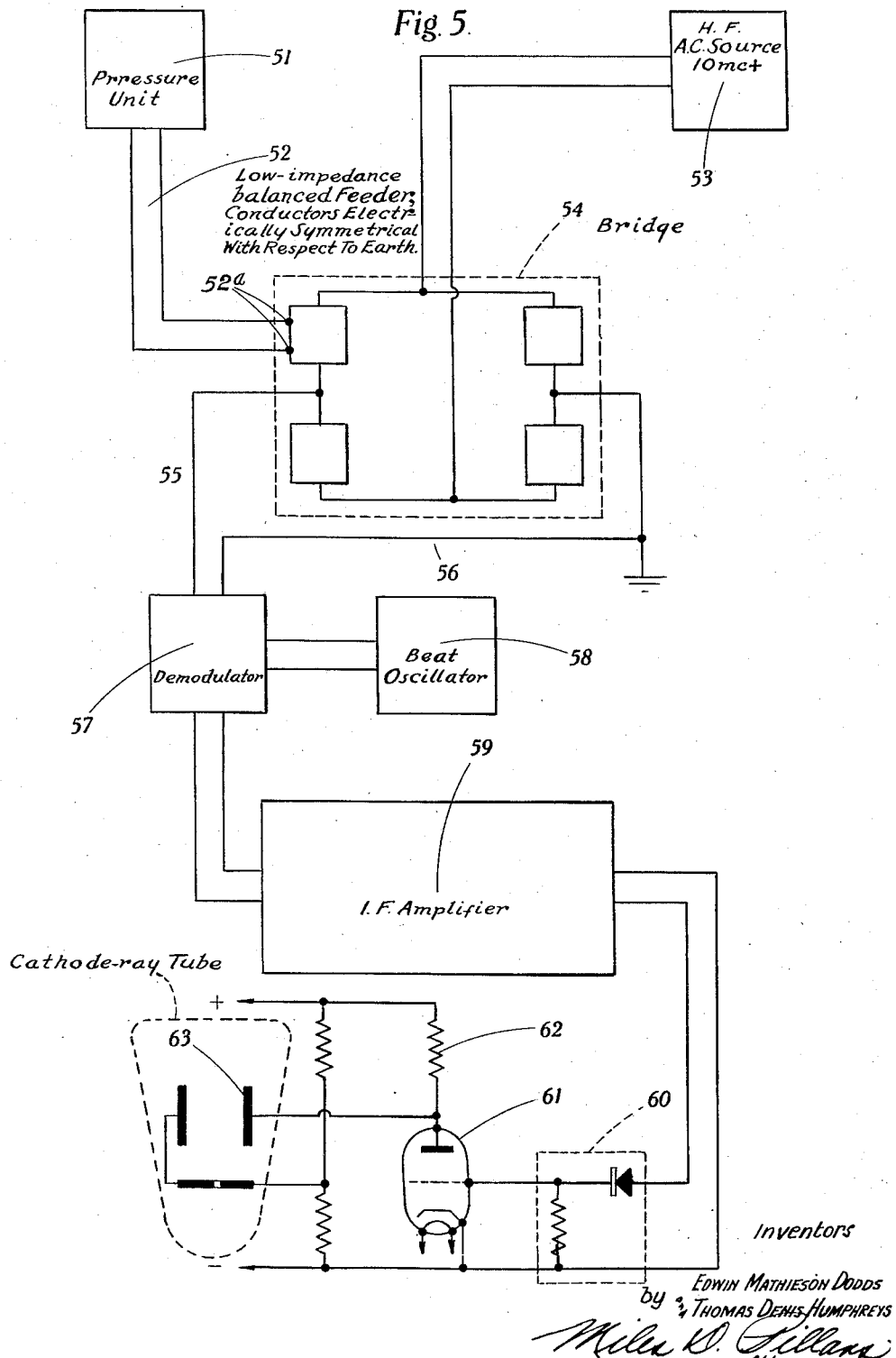

Figures 1 to 4 of the accompanying drawings are diagrammatic sectional views, each taken on the axis, of alternative constructions of condenser pressure elements each embodying certain features of the invention. Figure 2a is a face view of elements 11 and 12 in Figure 2. Figures 3 and 4 are fragmentary views, the upper parts being similar to the corresponding parts of Figures 1 and 2. Figure 5 is a schematic circuit diagram showing one arrangement in which the units of Figures 1 to 4 may be employed for measuring pressure or movement.

Figure 2A:

In the element illustrated in Figure 1, the diaphragm $1a$ is turned from the solid as part of the steel body $1$, which is threaded at $1b$ with a standard 14 millimetre spark plug thread for insertion in an engine cylinder, or other chamber the fluid pressures in which are to be measured. Thus the lower face of the diaphragm $1a$ is exposed to the pressures which are to be measured.

The duralumin member $2$ is rigidly secured to the middle of the diaphragm $1a$ by riveting over the projection $2b$, and must, therefore, move therewith. The top face of the member $2$ is plane and perpendicular to the direction of movement, and is arranged adjacent the bottom face of the duralumin member $6$, which is also plane and perpendicular to the direction of movement. The members $2$ and $6$ co-operate as the moving and fixed plates, respectively, of the element condenser.

The annular web $2a$ of the member $2$ is fixed at its edge by gripping between the threaded steel sleeve $3$ and a seating in the body $1$. The parallel diaphragms $1a$ and $2a$ constrain the member $2$ to move in such manner that its top face remains always perpendicular to the direction of movement.

The member $6$ is supported by the insulator $7$ which may be composed of highly resistive synthetic resin material such as that known under the name "Perspex." This insulator $7$ is in turn supported from the sleeve $3$ by the threaded steel sleeve $9$.

The width of the gap $8$ between the condenser plates may be adjusted by screwing the sleeve $9$ relatively to the sleeve $3$. It may then be secured in position by the lock nut $10$. For a pressure of about 500 pounds per square inch, a gap $8$ of about 0.001 inch to 0.002 inch has been found convenient.

Electrical connection to the member $6$ may be made with screened aero ignition cable secured in the sleeve $9$ and making contact with the point $6a$. The member $2$ is, of course, electrically connected through the diaphragms to earth.

The diaphragms $1a$ and $2a$ are of the "unsupported" or self-restoring type, the restoring force against deflection being provided by the mechanical resistance to deflection offered by these diaphragms themselves.

The diaphragms $1a$ and $2a$, together with body $1$ to which their edges are secured, form a chamber through which cooling water, or other temperature-maintaining fluid, such as oil or compressed air, may be passed. This is introduced and removed by way of ducts $5$ in the body $1$, and pipes $4$. This arrangement ensures that the diaphragm $1a$ is maintained as far as possible at a constant and suitable temperature by the passage of temperature-maintaining fluid in contact with substantially the whole of its upper face. It is therefore possible for it to be made comparatively thin without danger of permanent deformation, and thus a high degree of sensitivity is attained. For pressures ranging up to 1500 pounds per square inch, the thickness of the diaphragm $1a$ may be 0.026 inch, if the diameter is ½ inch, and the corresponding thickness of the diaphragm $2a$ may be 0.006 inch. Further, the arrangement ensures that the diaphragms are maintained as closely as possible to the same temperature as the body $1$, and so that variations of their tension, due to differential expansion with temperature, are avoided. It also provides a screen against the ingress or egress of heat to or from the remainder of the element by way of either the body $1$ or the diaphragm $1a$.

In the element illustrated in Figure 2, the self-restoring diaphragm $1a$, the lower face of which is exposed to the pressures which are to be measured, itself serves as the moving plate of the condenser. The fixed plate is duplicated in the actual construction shown, to provide a balanced electrical output, but the arrangement is similarly applicable when a single fixed plate is used. The fixed condenser plates $11$ and $12$ are symmetrical and are formed as D-shaped heads (Figure 2a) on rods $11a$, $12a$ to which the circuit connections are made by terminal screws at their upper ends. These rods are supported in "Perspex" insulators at both ends.

Temperature-maintaining fluid is introduced and removed by way of the ducts $5$ in the body $1$, and the pipes $4$, and is passed in contact with the upper face of the diaphragm $1a$ and with the condenser plates $11$ and $12$ and serves as the dielectric of the condensers.

It is preferred that the temperature-maintaining fluid acting also as dielectric shall be water from ordinary supply mains. In that case, however, the leakage resistance is so low that the element cannot satisfactorily be used with direct current polarization. Instead, it should be coupled to an electric circuit which carries alternating current of a frequency higher than the highest frequency of pressure variations to be measured. The circuit arrangements are such that the alternating current is modulated in frequency and/or phase and/or amplitude according to the capacity variations of the element. The pressure measurement is obtained by measuring the degree of the resulting modulation.

For pressures ranging up to 1500 pounds per square inch, the diaphragm $1a$ may be 0.026 inch thick and the gap between the condenser plates $11$, $12$ and the diaphragm $1a$ may be $\frac{1}{32}$ inch.

In the element illustrated in Figure 3, the arrangement of the moveable plate is similar to that of Figure 1 but the temperature-maintaining fluid is also admitted as dielectric between the condenser plates by the additional ducts $31$ in the body $1$ and sleeve $3$. This is preferably arranged by providing grooves in the body $1$, and by providing holes in the sleeve 3 which will register with these grooves when the sleeve 3 is screwed home, whatever the precise angular relative positions may then be.

In the element illustrated in Figure 4, the member 41 is largely similar to the member 2 of Figure 1, but no diaphragm corresponding to 2a of Figure 1 is provided. Reliance is placed upon the riveted connection between the member 41 and the middle of the diaphragm 1a to provide the necessary constraint of the member 41 to travel in the direction perpendicular to the faces of the fixed condenser plates 11 and 12, which are similar to those shown in Figure 2. Here again the temperature-maintaining fluid serves as dielectric.

Any of the types of electrical pressure element above described may be used with a variety of different types of measuring circuit, and provided that a high resistance dielectric is used they may be polarized with direct current. We prefer, however, to use alternating current polarization, and to measure the modulation of the alternating current produced by variation of the element impedance.

Figure 5 of the accompanying drawings is a schematic circuit diagram of a circuit arrangement embodying certain further features of the invention.

The electrical impedance pressure element 51 is coupled by a low impedance feeder 52 to a measuring circuit. This measuring circuit comprises a source 53 of alternating current of a frequency of the order of 10 megacycles or more, preferably about 40 megacycles, and a bridge 54, by means of which current from this source 53 is passed through the feeder 52 and the pressure element 51, and by means of which a response is produced in accordance with the modulation of this curernt by variations of the impedance of the pressure element 51.

The use of a low impedance feeder, by which is meant a feeder having a characteristic impedance of the order of 1000 ohms or less, between the element 51 and the measuring circuit, brings about a reduction of pick-up of interfering signals. This is particularly important when measurements are made on internal combustion engines having electrical ignition. We prefer to use a feeder having a characteristic impedance of about 75 ohms.

The feeder may be of the concentric type, but if a balanced impedance element is employed, for example a balanced condenser element such as is illustrated in Figure 2 or 4, then it is preferred that the feeder be of the balanced or symmetrical type in which the two conductors are electrically balanced with respect to earth.

It is desirable that the characteristic impedance of the pressure element 51 should be matched to that of the feeder 52, either directly or through the medium of an impedance-transforming circuit. Preferably a pressure element should be chosen having a characteristic impedance equal to that of the feeder, so that this may be achieved without any impedance-transforming circuit. An ordinary transformer should be avoided if possible, as it introduces interference and loss of efficiency. It is found that condenser pressure elements such as those hereinbefore described can conveniently be constructed to have a characteristic impedance of about 75 ohms at frequencies of about 40 megacycles, and such a characteristic impedance is very suitable for the feeder 52.

It is preferred that the feeder 52 should be so proportioned, with regard to the characteristic impedance presented to the feeder by the measuring circuit at the terminals 52a, that it presents to the pressure element 51, directly or through the medium of an impedance-transforming circuit, a characteristic impedance equal to that of the pressure element 51.

The bridge 54 may conveniently be constructed to have impedances of about 1000 ohms in each arm, and the feeder 52 with the pressure element 51 may be coupled through a step-up transformer to form one arm of the bridge. If the ratio is such that the characteristic impedance presented by the bridge at the feeder terminals 52a is equal to that of the feeder, and if the characteristic impedance of the element is also matched to that of the feeder, then the length of the feeder is immaterial. In other cases, however, the ratio of the feeder length to the wavelength of the carrier wave in the feeder, as well as other characteristics of the feeder, should preferably be correctly related with the terminating impedances.

Subject to the matching being correct, the sensitivity is substantially independent of feeder length, except for insertion loss.

In the arrangement illustrated, the output from the bridge, which consists of alternating current from the source 53, amplitude modulated in accordance with impedance variations of the pressure element 51, is taken by the conductors 55, 56, the latter of which is earthed, to a frequency changer 57. Alternatively, however, the signal may be amplified without change of carrier frequency.

If the bridge be so adjusted that at some pressure within the range of pressures to be measured, the element impedance assumes such a value that the bridge becomes balanced, then the output of the bridge will not be such as to discriminate between increases and decreases from that pressure. It is therefore usually preferred to adjust the bridge impedances in such manner that balance is obtained at a pressure just outside the range of pressures to be measured.

The beat oscillator for the frequency changer 57 is indicated at 58. The intermediate frequency output of the frequency changer 57, which is modulated in accordance with the impedance variations of the pressure element 51, is amplified in the intermediate frequency amplifier 59 and rectified in the rectifier 60. An intermediate frequency of about one megacycle has been found convenient when the frequency range of the pressure variations to be measured extends up to about 100 kilocycles. The rectified signal is amplified by the valve 61, having an anode load 62, and is then applied to the deflector plate 63 of a cathode ray tube.

In the appended claims where a condenser plate is stated to be "integral" with a diaphragm, such term is to be interpreted broadly to apply to structures shown in Figure 1 where the condenser plate is connected to the diaphragm and also in Figure 2 where the diaphragm acts as a condenser plate.

We claim:

1. An electrical condenser pressure element for measuring fluid pressures comprising a body, a self-restoring diaphragm secured to said body and having one face thereof exposed to the pressures to be measured, a movable condenser plate within said body connected to said diaphragm, a fixed condenser plate within said body spaced from said movable condenser plate, a dielectric filling the space between said movable and fixed condenser plates comprising a temperature maintaining liquid and passage means in said body leading to the space between said plates through which the dielectric is circulated.

2. An electrical condenser pressure element for measuring fluid pressures comprising a body, a self-restoring diaphragm secured to said body, one face of which is exposed to the pressure to be measured, a flat surfaced member rigidly fixed to the middle of said diaphragm to move therewith when the diaphragm is deflected, a second diaphragm positioned within said body and arranged parallel with said first diaphragm, said member being rigidly secured to said second diaphragm, a fixed condenser plate within said body spaced from said flat surfaced member and passages leading to the space within said body between said diaphragms through which temperature maintaining liquid is passed.

3. A pressure or movement measuring apparatus comprising an electrical condenser element having a condenser plate moved in accordance with the quantity to be measured, a fixed condenser plate spaced from said aforementioned condenser plate, a dielectric between said condenser plates comprising a temperature maintaining liquid, passage means for circulating said temperature maintaining liquid between said condenser plates, a measuring circuit comprising means for energizing said condenser plates having a source of alternating current of frequency greater than the highest frequency of quantity variations to be measured and means for measuring the degree of modulation of the alternating current by the variations in capacity of the electrical condenser element.

4. A pressure or movement measuring apparatus comprising an electrical condenser element having a condenser plate moved in accordance with the quantity to be measured, a fixed condenser plate spaced from said aforementioned condenser plate, a dielectric and temperature maintaining liquid between said condenser plates comprising water, a measuring circuit comprising means for energizing said condenser plates having a source of alternating current having a frequency of at least 10 megacycles and means for measuring the degree of modulation of the alternating current by the variations in capacity of the electrical condenser element.

5. A pressure or movement measuring apparatus comprising an electrical condenser element having a condenser plate moved in accordance with the quantity to be measured, a fixed condenser plate spaced from said aforementioned condenser plate, a body located around said condenser plates, a dielectric and temperature maintaining liquid between said condenser plates comprising water, passage means leading through said body means to the space between said condenser plates through which the dielectric is passed, a measuring circuit comprising means for energizing said condenser plates having a source of alternating current of a frequency of at least 10 megacycles and means for measuring the degree of modulation of the alternating current by the variations in capacity of the electrical condenser element.

6. A pressure or movement measuring apparatus which comprises an electrical condenser pressure element, a measuring circuit, a low impedance feeder comprising a pair of conductors having electrical symmetry with respect to ground for coupling said electrical condenser pressure element to said measuring circuit, said measuring circuit comprising a source of alternating current of a frequency of the order of 10 megacycles or more, said feeder having an impedance not greater than 1000 ohms at the frequency of said source, means for passing the current from said source through the feeder and the pressure element whereby the measuring circuit serves to give a response in accordance with modulation of said current by variations of the impedance of the pressure element.

7. A pressure or movement measuring apparatus which comprises an electrical condenser pressure element, a measuring circuit, a low impedance feeder comprising a pair of conductors having electrical symmetry with respect to ground for coupling said electrical condenser pressure element to said measuring circuit, said measuring circuit comprising a source of alternating current of a frequency of the order of 10 megacycles or more, said feeder having an impedance not greater than 1000 ohms at the frequency of said source and the characteristic impedance of said electrical condenser pressure element being matched to the impedance of said low impedance feeder, means for passing the current from said source through the feeder and the pressure element whereby the measuring circuit serves to give a response in accordance with modulation of said current by variations of the impedance of the pressure element.

8. A pressure or movement measuring apparatus which comprises an electrical condenser pressure element, a measuring circuit, a low impedance feeder comprising a pair of conductors having electrical symmetry with respect to ground for coupling said electrical condenser pressure element to said measuring circuit, said measuring circuit comprising a source of alternating current of a frequency of the order of 10 megacycles or more, said feeder having an impedance not greater than 1000 ohms at the frequency of said source and the characteristic impedance of said feeder and said electrical condenser pressure element being substantially equal, means for passing the current from said source through the feeder and the pressure element whereby the measuring circuit serves to give a response in accordance with modulation of said current by variations of the impedance of the pressure element.

9. An electrical condenser pressure device for measuring fluid pressures comprising a body, a self-restoring diaphragm secured to said body and having one face thereof exposed to the pressures to be measured, a movable condenser plate within said body connected to said diaphragm, a fixed condenser plate within said body spaced from said movable condenser plate, a dielectric filling the space between said movable and fixed condenser plates comprising a temperature maintaining liquid, passage means in said body leading to the space between said plates through which the dielectric is circulated, a measuring circuit comprising means for energizing said condenser plates having a source of alternating current having a frequency of at least ten megacycles and means for measuring the degree of modulation of the alternating current by variations in capacitance.

10. An electrical condenser device for measuring fluid pressures comprising a body, a self-restoring diaphragm secured to said body, one face of which is exposed to the pressures to be measured, a flat surfaced member rigidly fixed to said diaphragm to move therewith when the diaphragm is deflected, a second diaphragm positioned within said body and arranged parallel with said unsupported diaphragm, said member being rigidly secured to said second diaphragm, a fixed condenser plate within said body spaced from said flat surfaced member, a dielectric and temperature maintaining liquid between said condenser plates comprising water, a measuring circuit comprising means for energizing said condenser plates having a source of alternating current having a frequency of at least ten megacycles and means for measuring the degree of modulation of the alternating currents by the variations in capacitance.

11. An electrical condenser pressure device for measuring fluid pressure comprising a body, a self-restoring diaphragm secured to said body and having one face exposed to the pressure to be measured, a condenser plate integral with said diaphragm, a fixed condenser plate within and insulated from said body and spaced from said first-mentioned condenser plate, a liquid dielectric filling the space between said condenser plates and passage means in said body leading to the said space between said condenser plates through which said liquid dielectric is circulated to maintain steady the temperature of said liquid dielectric and of said condenser plates.

12. An electrical condenser pressure device for measuring fluid pressure comprising a body, a self-restoring diaphragm secured to said body and having one face exposed to the pressure to be measured, a condenser plate integral with said diaphragm, two fixed condenser plates insulated from each other and within and insulated from said body and spaced from said first-mentioned condenser plate, a liquid dielectric filling the space between said condenser plates and passage means in said body leading to the said space between said condenser plates through which said liquid dielectric is circulated to maintain steady the temperature of said liquid dielectric and of said condenser plates.

13. A pressure or movement measuring apparatus comprising a balanced electrical impedance element comprising two terminals having paths of equal impedance to ground, the impedance of said paths being variable equally and in the same sense when the quantity to be measured is changed, a measuring circuit comprising a source of alternating current, a balanced feeder for coupling the terminals of said pressure element to said measuring circuit comprising a pair of conductors having electrical symmetry with respect to ground, and means for passing the current from said source through said feeder and pressure element whereby said measuring circuit serves to give a response in accordance with the modulation of said current by variations of the impedance of said balanced element.

14. A pressure or movement measuring apparatus comprising a balanced electrical condenser element having two conductor plates insulated from each other and one movable condenser plate insulated and symmetrically spaced from said two fixed condenser plates and movable symmetrically relative to said two fixed condenser plates in accordance with the quantity to be measured, a measuring circuit comprising a source of alternating current, a balanced feeder for coupling said fixed condenser plates to said measuring circuit comprising a pair of conductors having electrical symmetry with respect to ground, and means for passing the current from said source through said feeder to said fixed condenser plates whereby said measuring circuit serves to give a response in accordance with the modulation of said current by equal variations of the capacitances between each of said fixed condenser plates and said first-mentioned condenser plate.

15. A pressure or movement measuring apparatus comprising a balanced feeder having two conductors which are electrically balanced with respect to ground, two condensers connected in series across one end of said feeder, means to hold the junction of said condensers at ground potential, means to vary the capacitance of said condensers equally and in the same sense in accordance with variations of the pressure to be measured, a measuring circuit comprising a source of alternating current and means for passing the current from said source through said feeder to said condensers whereby said measuring circuit serves to give a response in accordance with the modulation of said current by variations of the capacitances of said condensers.

16. A pressure or movement measuring apparatus comprising an electrical condenser pressure element having a body, a self-restoring diaphragm secured to said body and having one face exposed to the pressures to be measured, a condenser plate integral with said diaphragm, two fixed condenser plates insulated from each other and within and insulated from said body and spaced from said first-mentioned condenser plate, a liquid dielectric filling the space between said condenser plates and passage means in said body leading to said space between said condenser plates through which said liquid is circulated to maintain steady the temperature of said liquid dielectric and of said condenser plates, a measuring circuit comprising a source of alternating current, a balanced feeder for coupling said two fixed condenser plates to said measuring circuit comprising a pair of conductors having electrical symmetry with respect to ground, and means for passing the current from said source through said feeder to said fixed condenser plates whereby said measuring circuit serves to give a response in accordance with the modulation of said current by variations of the capacitances between each of said fixed condenser plates and said first-mentioned condenser plate.

17. A pressure or movement measuring apparatus according to claim 16 wherein said liquid dielectric filling consists of water and said source of alternating current has a frequency of the order of 10 megacycles or more.

THOMAS DENIS HUMPHREYS.
EDWIN MATHIESON DODDS.